Dec. 29, 1925.
Re. 16,237
T. G. MARTIN
SPECIAL SERVICE TRUNK FOR AUTOMATIC TELEPHONE SYSTEMS
Original Filed July 9, 1917 2 Sheets-Sheet 1
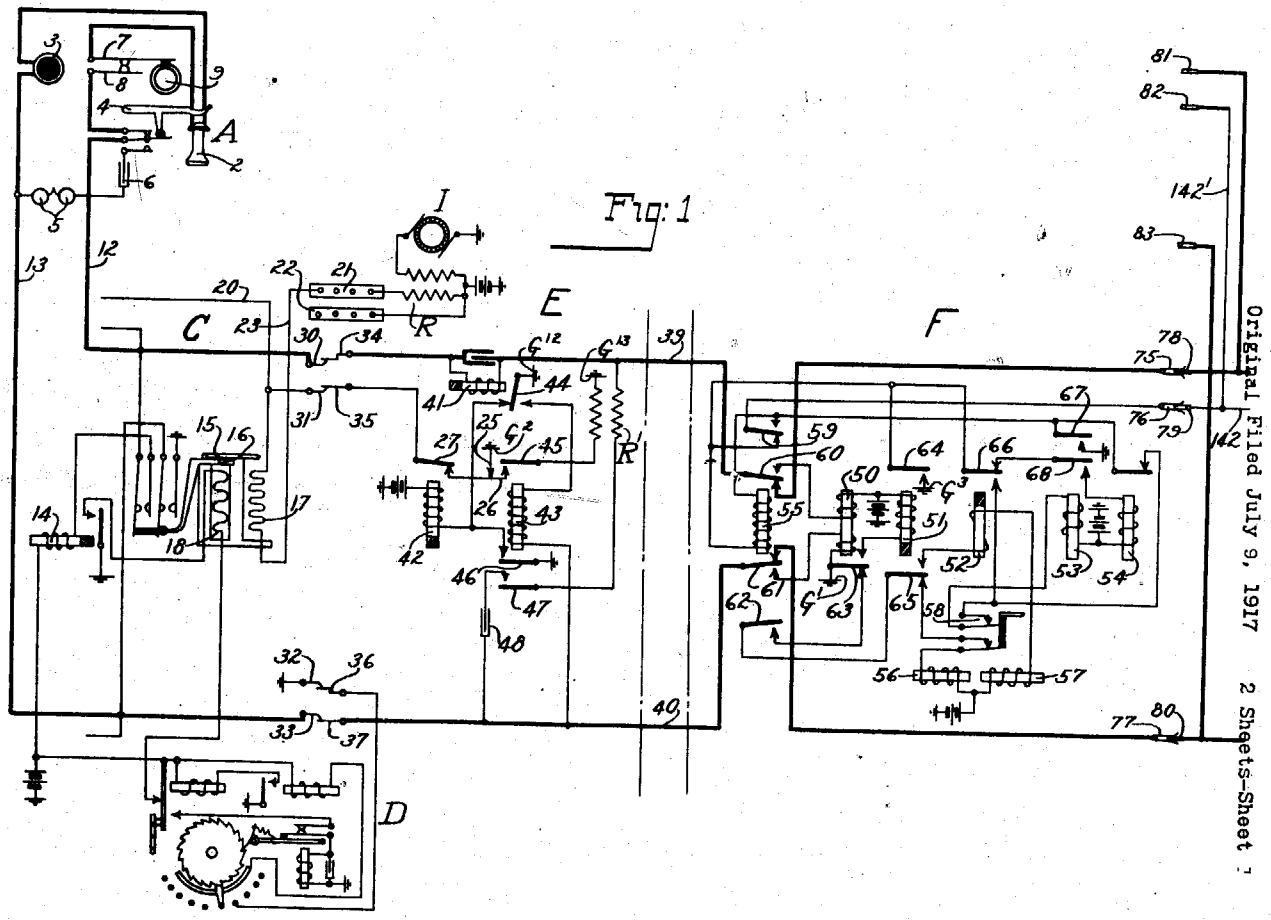
Inventor
Talbot G. Martin
Chas. M. Candy Atty.

Dec. 29, 1925. Re. 16,237
T. G. MARTIN
SPECIAL SERVICE TRUNK FOR AUTOMATIC TELEPHONE SYSTEMS
Original Filed July 9, 1917 2 Sheets-Sheet 2
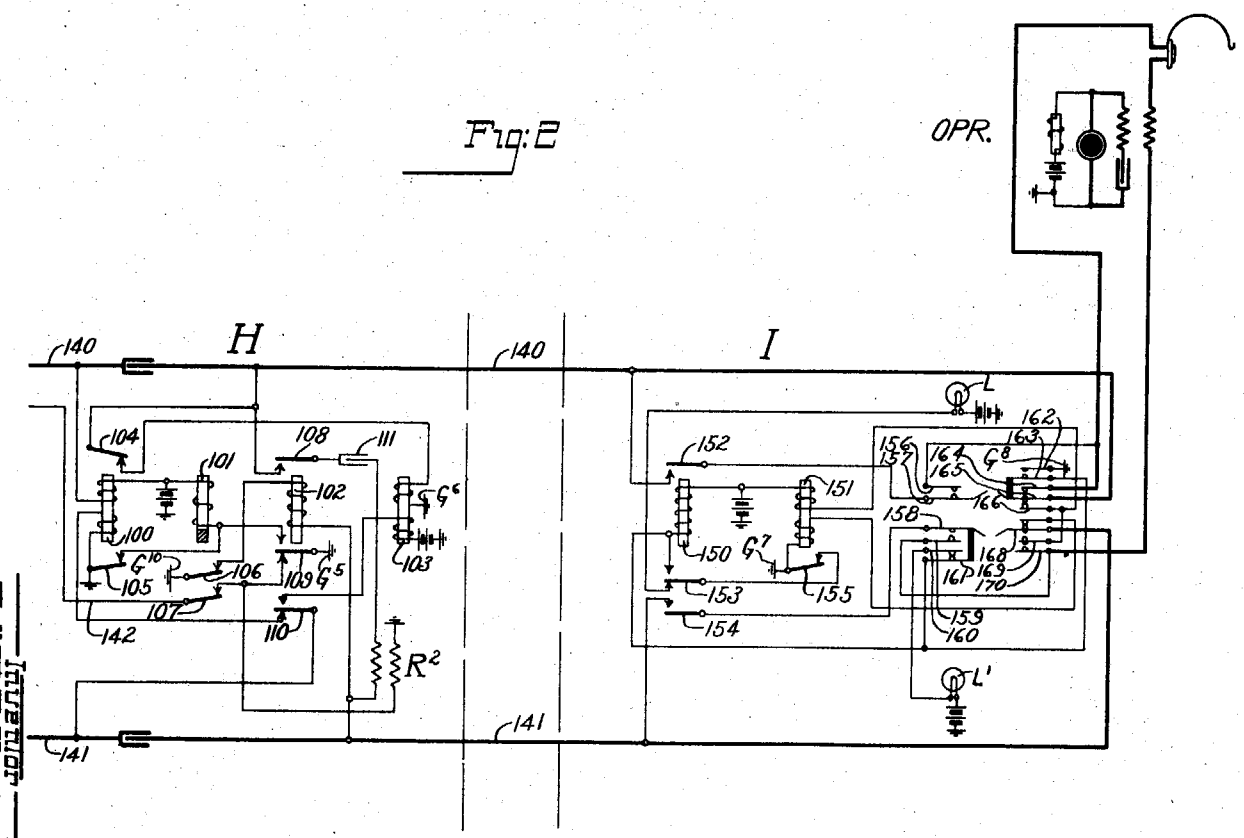
Inventor
Talbot G. Martin
Chas. M. Candy Atty.

Reissued Dec. 29, 1925. Re. 16,237

UNITED STATES PATENT OFFICE.

TALBOT G. MARTIN, OF CHICAGO, ILLINOIS, ASSIGNOR TO AUTOMATIC ELECTRIC COMPANY, OF CHICAGO, ILLINOIS, A CORPORATION OF ILLINOIS.

SPECIAL SERVICE TRUNK FOR AUTOMATIC TELEPHONE SYSTEMS.

Original No. 1,415,001, dated May 2, 1922, Serial No. 179,310, filed July 9, 1917. Application for reissue filed April 30, 1924. Serial No. 710,178.

*To all whom it may concern:*

Be it known that I, TALBOT G. MARTIN, a citizen of the United States of America, and a resident of Chicago, county of Cook and State of Illinois, have invented certain new and useful Improvements in Special Service Trunks for Automatic Telephone Systems, of which the following is a specification.

My invention relates in general to special service trunks for automatic telephone systems, but is more particularly concerned with details of improvement in toll recording trunks over which automatic subscribers call the toll recording operators for the purpose of placing long distance calls. In telephone systems of this character in which, it may be stated, it is the general practice to give toll service to the subscribers whenever requested, the calls being charged and billed at regular intervals, there are always a few subscribers to whom calls cannot be charged by reason of their poor credit; and there may also be certain subscribers whose instruments are equipped with prepay coin boxes. It is extremely desirable in such a system that when a call is received by the toll recording operator she be immediately and automatically informed by some distinctive signal of the character of the calling line—whether the calling subscriber is entitled to have calls charged to his account, whether he is to be denied service on account of poor credit, or whether payment should be required in advance.

Systems in which the toll recording operator is given a discriminating test according to the general plan outlined above have been devised before this, but they are not very well adapted for use in certain types of highly organized exchange networks involving main exchanges and sub-exchanges auxiliary thereto; and it is the principal object of the present invention to produce an arrangement of circuits whereby a centrally located toll recording operator who is accessible to calling subscribers in both main exchanges and sub-exchanges, may be automatically informed whenever a call is received of the character of the calling line.

The precise manner in which the foregoing and other useful objects are attained, and the necessary apparatus, will be described and explained hereinafter, reference being had to the accompanying drawings, which illustrate diagrammatically the essential features of an automatic telephone system embodying the principles of my invention.

For a complete understanding of the drawings they should be placed in order with corresponding lines at the ends thereof in alignment, when it will be seen that I have shown a complete circuit connection extending from the substation A in Fig. 1 to the apparatus I (Fig. 2) at a toll recording operator's position. The connection has been established through the medium of the individual line switch C, the trunk line comprising conductors 39 and 40 and the relay equipment E associated therewith, the selector switch F, the trunk line comprising conductors 140 and 141 and a second relay equipment which is indicated by the reference character H. The individual line switch C and the relay equipment E are located at a sub exchange, the selector F and relay equipment H are located at a main exchange, while the recording operator's equipment I may be located either at one of the main exchange or at a special centrally located toll switching center.

Referring to Fig. 1 the substation A may be of any suitable type such for example as the one disclosed in British patent to Martin No. 1419 of 1910. As shown herein it comprises essentially the receiver 2, transmitter 3, switch hook 4, ringer 5, and condenser 6. Being an automatic substation there is also provided a pair of impulse springs 7 and 8 which may be controlled by the impulse wheel 9 through the medium of a finger hole dial (not shown).

The line conductors 12 and 13 extend to the exchange where they terminate in the individual line switch C which is of the general type of line switch disclosed in the Brtish patent to James No. 26,301 of 1906, being, however, of the particular type shown in U. S. Letters Patent No. 1,078,690, granted January 17, 1912, to Frank Newforth. Through the medium of line switch C the line of substation A when calling is given access to a plurality of trunk lines extending to the main exchange and terminating therein in the usual first selector switches.

These trunk lines each consists of a single pair of line conductors and the maintaining of the line switch C in operated position, which is usually provided for by a third conductor in each trunk line, is taken care of in the system shown herein by means of the relay equipment E.

The line switch and a plurality of similar line switches are controlled in their trunk selecting operations by a master switch D which is of the general type of master switch disclosed in the above mentioned patent to James No. 26,301 of 1906, being, however, more nearly of the particular type disclosed in the British patent to Martin No. 1419 of 1910 also previously referred to. As is well known the function of the master switch is to maintain the plungers of all the idle line switches which it controls in position before the terminals of an idle trunk line.

The selector F in which the trunk line 39—40 terminates at the main exchange may be of the general type of selector switch disclosed in U. S. Letters Patent No. 815,321, granted March 13, 1906, to Keith, Erickson and Erickson. The side switch and private magnet are omitted, however, and the cirsuits are modified in accordance with modern two wire practice. The selector F in common with a plurality of similar selectors is given access to a plurality of groups of trunk lines (not shown) which extend to second selectors through the medium of which connections may be extended toward local subscribers in the system. All of these groups of trunk lines do not extend to second selectors, however, for a certain selector level is set aside for the purpose of calling long distance, whereby connections may be extended to toll recording operators. One of the trunk lines extending from the special level of the selectors, which it may be stated is usually the tenth level, is the trunk line comprising the conductors 140 and 141 which terminate in the toll recording operator's equipment I. The relay equipment H is provided principally to avoid the necessity of providing a third conductor in the trunk line and the operation of this relay equipment together with the operation of the equipment I will be described fully hereinafter.

For supplying operating and talking current I have shown throughout the drawings a plurality of batteries each having its positive pole grounded. It will be understood, however, that in practice there may be but one battery or preferably a battery for each exchange. The distinctive tones by which the operator is to distinguish between the different kinds of calling lines are supplied from signalling machines one of which is shown in Fig. 1 as comprising the interrupter I′ and induction coil R. Means is provided whereby the holding winding 17 of the line switch C and the holding windings of the other line switches may be connected either to the live pole of central battery direct or to the battery by way of the low resistance secondary winding of the induction coil R. This means is indicated diagrammatically as comprising a pair of bus bars 21 and 22 which are connected, respectively, with the secondary winding of the induction coil and with the battery, and to either of which the conductor 23 and corresponding conductors associated with the other line switches may be connected. While I have shown means for providing only one characteristic tone, it will be understood that a plurality of equipments similar to the one shown may be provided each differing from the other in the kind of tone produced, and each being provided with a bus bar similar to the bus bar 21. The bus bar to which the holding winding of any particular line switch is connected will of course depend upon the kind of service to which the subscriber on the associated line is entitled. The discriminating tone equipment also includes an induction coil associated with the relay equipment in each trunk line to which the line switch C has access. Thus there is shown associated with the relay equipment E an induction coil R′, one winding of which is adapted to be included in the circuit of the holding winding 17 of the line switch C or the holding winding of any other calling line switch, and the other winding of which is adapted to be connected in bridge of the talking conductors of the trunk line. Since the trunk line 140—141 is accessible not only to incoming selectors, such as the selector F, but also to local selectors which are accessible to calling subscribers in the main exchange, it is evident that means must be provided whereby if a call is received from a main exchange subscriber rather than from a sub exchange subscriber the toll recording operator will be given a discriminating test also. The relay equipment H is therefore provided with an induction coil $R^2$ one winding of which is adapted to be included in series with the third conductor 142 of the associated trunk line which the other winding is adapted to be connected in bridge of the conductors 140—141.

Having given a brief description of the apparatus involved I will now proceed to explain more in detail the operations incident to the extension of connections to the toll recording operator and the transmission to her of the distinctive tones which are calculated to notify her of the character of the calling line. For this purpose it will be assumed that the subscribed at substation A, which subscriber it will be further assumed is not entitled to toll service on account of his poor credit, desires to call a toll recording operator for the purpose of endeavoring to place a long distance call. Thereafter a brief explanation will be made of the corresponding operations which take place when the calling subscriber is located in the main exchange rather than in the sub exchange.

When the calling subscriber at substation A removes his receiver to initiate the call an energizing circuit is completed over the line conductors 12 and 13 for the line relay 14 of the line switch C. Upon attracting its armature the line relay 14 closes a circuit for the operating winding 18. Upon energizing the winding 18 operates both the plunger arm 15 and the cut off armature 16; the former through the medium of its plunger (not shown) forcing the bank springs 30, 31, 32 and 33 into engagement, respectively, with the contacts 34, 35, 36 and 37; and the latter disconnecting the line conductors 12 and 13 from the winding of the line relay 14 and from ground. By the engagement of the bank springs 30 and 33 with contacts 34 and 37, respectively, the line conductors 12 and 13 are extended by way of trunk conductors 39 and 40 and normally closed contacts of the switching relay 55 to the double wound line relay 50 of the selector F at the main exchange. The following circuit, including the windings of relay 50 and the winding of the slow acting relay 41 at the sub exchange, is thereupon completed; ground at $G^1$, lower winding of relay 50, resting contact of armature 61 and the said armature, conductor 40, contact 37, bank spring 33, line conductor 13, substation A, line conductor 12, bank spring 30, contact 34, winding of relay 41, conductor 39, armature 60 and its resting contact, and the upper winding of the line relay 50 to battery. Relays 41 and 50 are energized in series upon the closure of the above circuit. The former relay upon attracting its armature completes a circuit for the slow acting relay 42 in an obvious manner. Upon energizing relay 42 closes a holding circuit for the line switch C as follows: ground at $G^2$, contact point 25, spring 26, working contact of armature 27 and the said armature, contact 35, bank spring 31, holding winding 17, conductor 23, bus bar 21, and the secondary winding of the induction coil R to battery. It is understood that the line relay 14 is sufficiently slow acting to maintain the operating winding 18 energized until after the above holding circuit has been established. A branch of the holding circuit extends by way of conductor 20 to multiple test contacts in the banks of connector switches having access to the line of substation A, where by a ground potential on these test contacts the said line is made busy. By the engagement of bank spring 32 with contact 36 a circuit is closed whereby the master switch D is operated in the well known manner to advance the plungers of all the remaining idle line switches into position before the terminals of the next idle trunk line. At the selector F the energization of the line relay 50 is followed by the energization of the slow acting relay 51 which prepares circuits for the vertical and rotary magnets 57 and 54 in the usual manner.

The foregoing operations whereby the line conductors 12 and 13 have been extended to the selector F at the main exchange have taken place in response to the removal of the receiver at substation A. Assuming that the recording trunks are terminated in the tenth selector level, as previously mentioned, the calling subscriber will now operate his dial in accordance with the digit 0, thereby separating the impulse springs 7 and 8 ten times and interrupting each time the circuit of the line relay 50 of the selector E. The relay 41 which is included in the circuit of the line relay 50 is slow acting and does not deenergize when its energizing circuit is momentarily interrupted. The line relay 50, however, responds to each interruption of its circuit, and at each deenergization transmits an impulse from ground $G^1$ through the slow acting relay 52 and the vertical magnet 57 in series, the circuit being as follows: ground at $G^1$, armature 63 and its resting contact, resting contact of armature 62 and the said armature, armature 65 and its working contact, winding of relay 52 and the winding of the vertical magnet 57 to battery. In response to these impulses the vertical magnet is operated to raise the switch shaft step by step until the wipers 75, 76 and 77 arrive at the tenth horizontal level of bank contacts. The relay 52 is energized in series with the vertical magnet, and being slow acting, retains its armature attracted during the series of impulses. At the first upward step of the shaft the off normal springs 58 are closed and an initial energizing circuit for the stepping relay 53 is completed as follows: ground at $G^3$, working contact of armature 64 and the said armature, armature 66 and its working contact, off normal springs 58 and the winding of relay 53 to battery. Upon energizing, relay 53 completes a locking circuit for itself at its armature 67 in an obvious manner and at its armature 68 prepares a circuit for the rotary magnet 54 which is held open during the vertical movement of the switch by the relay 52. It should be mentioned at this point that when the off normal springs 58 were closed the switching relay 55 and the stepping relay 53 were connected in series over a circuit which will be traced hereinafter. But since the junction of these two relays has been grounded as already mentioned, the relay 55 will be short circuited for the present and therefore inoperative. At the end of the series of impulses the slow acting relay 52 is deenergized and the circuit of the rotary magnet 54 is completed as follows: ground at $G^3$, working contact of armature 64 and the said armature, armature 66 and its resting contact, armature 68 and its working contact, and the winding of the rotary magnet 54 to battery. By the operation of the rotary magnet upon the closure of the above circuit the switch wipers 75, 76 and 77 are rotated into engagement with the first set of bank contacts in the tenth level. Near the end of its stroke the rotary magnet opens its interrupter contact, thereby breaking the locking circuit of the stepping relay 53. The relay 53 is accordingly deenergized and breaks the energizing circuit of the rotary magnet which also deenergizes. The operation now depends upon whether the first trunk line terminating in the tenth level is busy or idle. If this trunk line is busy there will be a ground potential upon the test contact with which the test wiper 76 is in engagement which ground potential will be effective to maintain the short circuiting of the switching relay 55 and to again energize the stepping relay 53. The rotary magnet 54 will therefore be again operated to rotate the switch wipers into engagement with the next set of bank contacts in the tenth level. It will be seen that since the stepping relay 53 and the rotary magnet 54 each controls the circuit of the other a vibratory action of the rotary magnet will be set up which will continue as long as the test wiper 76 continues to engage busy or grounded test contacts. When an ungrounded test contact is reached, corresponding to an idle trunk line, and assumed in the present case to be the test contact 79, upon the deenergization of the stepping relay 53 the switching relay 55 will no longer be short circuited and will be operated as soon as the rotary magnet 54 retracts its armature by current flow in the following circuit: ground at $G^3$, working contact of armature 64 and the said armature, winding of relay 55, interrupter contact of the rotary magnet 54, off normal springs 58 and the winding of the stepping relay 53 to battery. Owing to the high resistance of relay 55 the stepping relay 53 is not operated. The energization of relay 55 brings about the following circuit changes. At the armature 62 a contact in the circuit of release magnet 56 is opened to guard against the release of the switch upon the deenergization of relays 50 and 51; at armature 59 the test wiper 76 is shifted from the upper to the lower terminal of the said relay 55; and at armatures 60 and 61 the conductors 39 and 40 are disconnected from the windings of the line relay 50 and are extended by way of wipers 75 and 77, bank contacts 78 and 80 and conductors 140 and 141 to the double wound relay 100 of the relay equipment H (Fig. 2).

The relay 100 is energized therefore over the calling subscriber's loop and upon attracting its armature completes a circuit for the slow acting release relay 101. Relay 101, upon energizing, completes a holding circuit for the switching relay 55 of selector F as follows: Ground at $G^5$, armature 109 and its resting contact, working contact of armature 107 and the said armature, conductor 142, test contact 79, test wiper 76, and armature 59 and its working contact to the lower terminal of the switching relay 55 whence the circuit continues through the windings of relays 55 and 53 as previously traced.

A further result of the energization of relay 100 is the closure of a circuit over trunk conductor 140 for the relay 151 at the recording operator's position which circuit may be traced as follows: Ground at $G^6$, upper winding of impedance coil 103, working contact of armature 104 and the said armature, conductor 140, contact springs 165 and 166 of key K and the upper winding of relay 151 to battery. Relay 151 is operated over the above circuit and completes a circuit for the line lamp L as follows: Ground at $G^7$, armature 155 and its working contact, armature 153 and its resting contact, and the said lamp L to battery. By the lighting of the lamp L the operator is informed that a call has been received.

Upon perceiving the signal, the operator will respond by throwing the key K in such a direction that the right hand sets of contact springs are actuated. Assuming that the ordinary double throw key is used the key will be thrown backward. By the closure of contact springs 162 and 163 a circuit is completed for the relay 150 as follows: Ground at $G^8$, contact springs 162 and 163, and the winding of relay 150 to battery. Upon energizing, relay 150 extinguishes the line lamp L by opening its circuit at the resting contact of the armature 153 and at the working contact of the same armature completes a locking circuit for itself extending from ground $G^7$. A continuation of this locking circuit may be traced from the lower terminal of relay 150 by way of contact springs 161 and 160 of the key K and the lamp L′ to battery. The lamp L′ is a busy lamp and remains lighted continuously, except when the key K is thrown to listening position, until the connection is finally released. As a further result of its energization relay 150 extends the conductors 140 and 141 by way of its armatures 152 and 154 to the springs 157 and 158 of the key K in order that when the key K is thrown to listening position the operator's head set may be connected across the line.

In addition to the closure of the circuit of relay 150 the reverse operation of key K produced other results which will now be described. By the separation of contact springs 165 and 166 and the engagement of contact springs 168 and 169 the upper winding of relay 151 is disconnected from the trunk conductor 140 and is connected instead to the trunk conductor 141. Furthermore the lower winding of the said relay 151 is disconnected from trunk conductor 141 at the resting contact of spring 168. Also it will be seen that by the engagement of contact springs 164 and 165 and contact springs 168, 169 and 170 the operator's head set indicated by the reference character Opr is connected in bridge of the conductors 140 and 141. By the shifting of the connection of the relay 151 as above described a circuit is completed for the relay 102 which may be traced as follows: Ground at $G^{10}$, armature 106 and its working contact, winding of the relay 102, conductor 141, contact springs 168 and 169 of key K and the upper winding of relay 151 to battery. Upon energizing, the relay 102 bridges the left hand winding of induction coil $R^2$ across the trunk at its armature 108; at the resting contact of its armature 109 removes the short circuit from the right hand winding of the said induction coil (these operations being of no particular importance in the present connection however); at working contact of armature 109 completes an energizing circuit for relay 101 extending from ground $G^5$; and at its armature 110 disconnects the incoming section of the line conductor 141 from the lower winding of relay 100 and connects it instead to the lower winding of the impedance coil 103. By this latter operation the lower side of the line is shifted from the grounded to the nongrounded pole of battery and since now both sides of the line extend to the same pole of the battery the relay 100 will be deenergized. Relay 101, however, is still maintained in operated position by way of the circuit just completed at the working contact of armature 109, and when the relay 102 is energized the relay 55 of the selector F is maintained in an operated position over a circuit extending from ground through the winding of induction coil $R^2$, working contact of armature 107 and said armature, conductor 142, thence over the previously described circuit to battery. Upon the cessation of current flow over the calling line the relay 41 which is included in the line circuit at the sub exchange is deenergized and a circuit is thereupon completed for the high resistance relay 43 which may be traced as follows: Ground at $G^{12}$, armature 44 and its resting contact, winding of relay 43, conductor 40, armature 61 and its working contact, wiper 77, bank contact 80, conductor 141, armature 110 and its working contact, and the lower winding of the impedance coil 103 to battery. Upon energizing, relay 43 completes a holding circuit for the slow acting relay 42 at its armature 46; at its armature 47 connects the right hand winding of induction coil $R^1$ across the conductors 39 and 40 in series with condenser 48; and at its armature 45 breaks the formerly described holding circuit for the line switch C and completes a new holding circuit over the following path: Ground at $G^{13}$, left hand winding of induction coil R′, armature 45, spring 26, working contact of armature 27 and the said armature, contact 35, bank spring 31, holding winding 17, conductor 23, bus bar 21 and the secondary winding of the induction coil R to battery. By the inductive action between the two windings of the induction coil R′ a distinctive tone characteristic of the subscribers who are not entitled to have toll calls charged to their account is transmitted to the recording operator. Although the operator now has her head set bridged across trunk conductors 140 and 141 so that she can distinguish the signal she will be unable to talk to the calling subscriber because of the fact that there is practically no current flow through the receiver and transmitter at the calling substation. Of course a small amount of current will flow from ground $G^{12}$ through the relay 43, the substation A, and to battery by way of the upper heavy line conductor, but the relay 43 is of extremely high resistance, and the current flow through the substation is therefore insufficient to render the transmitter active for talking purposes. For the same reason, the receiver, which it may be stated is a direct current receiver, without permanent magnets, is not made sensitive enough to enable the calling subscriber to hear the tone to any great extent. In fact it will ordinarily pass unnoticed.

To proceed with the operation, when the operator recognizes the characteristic signal she will throw her key K forward to its listening position, thereby extinguishing the busy lamp L′ and retaining her head set in bridge of conductors 140 and 141, the relay 150 being in operated position. By the shifting of the key it will be understood that the circuits are restored to their original condition as they were before the key was actuated. In other words, relays 102 and 43 are deenergized and relays 100 and 41 are again operated. The operator is now able to converse with the calling subscriber. Transmitter current is supplied over the calling line through the windings of the relay 100 while the voice currents take the path shown in heavy lines. The instructions given a subscriber whose credit is not good when he attempts to secure a long distance connection will vary with different telephone companies, but he will usually be asked to come to the central office to talk.

Whatever may be the character of the conversation, it will finally be terminated and the calling subscriber will hang up his receiver bringing about disconnection of the apparatus in the usual manner. Briefly by the replacement of the receiver the energizing circuit of relays 41 and 100 is broken and these relays deenergize causing a deenergization of relays 42 and 101. By the deenergization of relay 42 the circuit of the holding winding 17 is broken, whereupon the line switch C is restored by permitting its plunger to be withdrawn from the bank. By the deenergization of relay 101 the holding circuit of the switching relay 55 of the selector F is broken and by the resulting deenergization of relay 55 a circuit is completed for the release magnet 56. The release magnet 56 is accordingly operated to restore the selector F to normal, its circuit being broken at the lower pair of off normal springs when the switch shaft reaches its lowest position. At the operator's position relay 151 was deenergized when its circuit was broken by the deenergization of relay 100 and the deenergization of relay 151 is of course followed by the deenergization of relay 150, whereupon all the apparatus will have been restored to normal position.

It will be understood that the trunk line which extends by way of the relay equipment H to the recording operator's position is not only accessible to incoming selectors, such as selector F, but also to local selectors which are accessible to calling subscribers in the main exchange. The local subscribers are classified as regards their long distance service in the same way as the subscribers at the sub exchanges and each group of line switches in the main exchange is accordingly equipped similar to the group of line switches including the line switch C. No line switches or first selectors forming part of the local trunking system in the main exchange are shown, but it will be understood that when a calling subscriber removes his receiver his line is extended by the operation of its individual line switch to an idle first selector, which in turn may be operated to establish connection with an idle trunk line in any one of the several groups of trunk lines accessible to the selector. After the line switch and the selector switch have been operated both switches are maintained in operated position over a holding circuit including the third conductor of the trunk line with which the selector switch has established connection, in the usual and well known manner. Reference is had at this time to the previously mentioned patent to Newforth No. 1,078,690 in which switches operating as above described are shown. If the calling subscriber desires to call a toll recording operator he will operate his calling device in accordance with the digit 0, whereupon the wipers of the selector are raised to the tenth level and automatically rotate to select a set of contacts in which terminates an idle recording trunk. The trunk selected may be assumed to be the trunk shown in the drawing in which case the selector wipers will establish connection with the multiple contact set comprising contacts 81, 82 and 83. The line relay 100 is thereupon energized over the two sides of the calling line in series and closes the usual energizing circuit for the slow acting relay 101. The holding circuit for the calling line switch and the selector which by these operations is completed may be traced in part as follows: Ground at $G^5$, armature 109 and its resting contact, working contact of armature 107 and the said armature, conductor 142′, test contact 82, test wiper of the operated selector switch, whence it extends through a relay in the selector and the holding winding of the line switch in parallel to battery or may extend through the secondary winding of an induction coil to battery similar to that shown at R. The operations from this point on are the same as have been already described. It will be evident that when the operator throws her key in response to the lighting of the line lamp L, thereby causing the energization of relay 102, she will be given a distinctive tone by way of the holding circuit and the inductively related windings of the induction coil $R^2$.

Attention is called to the arrangement whereby the operator is compelled to listen for the tone before she can talk to the calling subscriber. If on receiving a call the operator should first throw her listening key K forward such operation would be of no effect for the relay 150 has not yet become energized. Since the relay 150 can only be energized by the reversed operation of the key it will be apparent that in order to answer a call the operator must proceed as hereinbefore described.

Having described my invention what I consider to be new and desire to have protected by Letters Patent will be pointed out in the appended claims.

What I claim as my invention is:

1. In a telephone system comprising a main exchange and a sub-exchange, the combination with subscribers' lines in the sub-exchange classified in accordance with the kind of service to which they are entitled, of an operator's position, means including an automatic switch in each exchange for extending a talking circuit from a calling line in the sub-exchange to the said operator's positions, and automatic means controlled by the operator for connecting a distinctive tone to said talking circuit for informing the operator of the class to which the calling subscriber belongs.

2. In a telephone system comprising a main exchange and a sub-exchange, the combination with suitably classified subscribers' lines in the sub-exchange, of a two-conductor trunk connecting the two exchanges, an operator's position; means including said trunk and an automatic switch in each exchange for extending a calling line in the sub-exchange to said operator's position, and automatic means controlled by the operator to connect a normally disconnected tone to the conductors of said trunk line for informing the operator of the class to which the calling subscriber belongs.

3. In a telephonic system comprising a main exchange and a sub-exchange, the combination with suitably classified subscribers' lines in the sub-exchange, of a two conductor trunk connecting the two exchanges, an operator's position, an automatic switch responsive to the removal of the receiver on a calling line in the sub-exchange for connecting the same with said trunk, a tone associated with said trunk line, a second automatic switch for extending said trunk to said operator's position, and automatic means controlled solely by said operator for connecting said tone to said trunk line to ascertain the class to which the calling subscriber belongs.

4. In a telephone system comprising a main exchange and a sub-exchange, the combination with suitably classified subscribers' lines in both exchanges, an operator's position, means including a plurality of automatic switches for extending a talking circuit from a calling line in the main exchange to said operator's position, means including a corresponding plurality of switches for extending a talking circuit from a calling line in the sub-exchange to said operator's position, and automatic means operative in either case for connecting a distinctive tone to the talking circuit after the same is established for informing the operator of the class to which the calling subscriber belongs.

5. In a telephone system comprising a main exchange and a sub-exchange, the combination with subscribers' lines in the sub-exchange certain of which are restricted service lines, of a trunk having two talking conductors connecting said exchanges, an operator's position, an automatic switch individual to a calling line in the sub-exchange for connecting such calling line with said trunk line, additional means for extending the trunk line to the said operator's position, and means controlled over said talking conductors by said operator for giving the operator a characteristic signal if the calling line is a restricted service line.

6. In a telephone system comprising a main exchange and a sub-exchange, the combination with subscribers' lines in the sub-exchange certain of which are restricted service lines, of a two-conductor trunk connecting said exchanges, an operator's position, an automatic switch individual to a calling line in the sub-exchange for connecting such calling line with said trunk line, additional means for extending the trunk line to the said operator's position, a source of signalling current, operator controlled means for connecting said source to said trunk line to give the operator a characteristic signal if the calling line is a restricted service line, and means for preventing the operator from connecting her headset to said trunk line without also operating the said means for connecting said signalling current source.

7. In a telephone system, subscribers' lines classified as restricted and non-restricted service lines, an operator's position, means including automatic switching mechanism for extending a calling line of either class to said operator's position, a source of talking current in series with the extended calling line, automatic means for giving the operator a distinctive signal to indicate to what class the calling subscriber belongs, and means for decreasing the supply of talking current to the calling line while the operator is being signalled.

8. In a telephone system, subscribers' lines classified as restricted and nonrestricted service lines, direct current receivers at the substations on said lines, an operator's position, means including automatic switching mechanism for extending a calling line of either class to said operator's position, a source of current connected in series with the extended line for rendering the associated receiver sensitive, means independent of the subscriber for giving the operator a distinctive audible signal to indicate the classification of the calling line, and means for simultaneously decreasing the supply of current to the receiver on the calling line, whereby it is rendered less sensitive and the calling subscriber is prevented from hearing said signal.

9. In a telephone system, a calling line, a trunk line, an audible signal, means individual to said calling line for associating said signal with said trunk line, an operator's trunk circuit, means including said trunk line for extending said calling line to said operator's trunk circuit, and means individual to said trunk line controlled by said operator for connecting said signal to said trunk line and over said trunk line to the operator's circuit.

10. In a telephone system, a calling line, a trunk line, an audible signal, means individual to said calling line for associating said signal with said trunk line, an operator's trunk circuit, means including said trunk line for extending said calling line to said operator's trunk circuit, and means individual to said trunk line controlled by said operator for connecting and disconnecting said signal to and from said trunk line.

11. In a telephone system, a calling line, an audible signal for said line, a trunk line, an operator's position, means including said trunk line for extending a talking connection from said calling line to said operator's position, means controlled by the operator for connecting said signal to said trunk line, and means for preventing the connection of the operator's headset to the trunk line unless the signal is connected to the trunk line also.

12. In a telephone system, a line, a trunk line, means including automatic switches and said trunk line for extending a connection from said line to an operator's trunk circuit, a relay individual to said trunk line, and means at the operator's position for controlling said relay to connect an audible signal over said trunk line to said operator's circuit.

13. In a telephone system, a line, a trunk line, subscriber controlled means for extending a connection from said line over said trunk to an operator's trunk circuit, a relay individual to said trunk line controlled by said operator to connect an audible signal over said trunk line to said operator's circuit.

14. In a telephone system, a line, a trunk line, means for extending a connection from said line over said trunk line to an operator's trunk circuit, a relay individual to said trunk line, means for energizing said relay when the connection is extended, and means controlled by the operator for deenergizing said relay to connect a distinctive tone over said trunk line to said operator's circuit.

15. In a telephone system, a line, a trunk line, means for extending a connection over said trunk line to an operator's trunk circuit, and for establishing a flow of current over the trunk line, a relay individual to said trunk line energized by said current, and means for reducing said current flow to deenergize said relay to connect a distinctive tone over said trunk line to said operator's trunk circuit.

16. In a telephone system, a line, a trunk line, an automatic switch controlled over said line for extending a connection to said trunk line, an operator's trunk circuit, another automatic switch operative to extend said connection to said trunk circuit, a relay individual to said trunk line, a source of signalling current, and a key in said circuit for causing the operation of said relay to connect said signalling current source in bridge of said trunk line.

17. In a telephone system, telephone lines divided into classes, an operator's trunk circuit, automatic switching mechanism for extending a calling line of any class to said circuit, a source of talking current in series with the extending calling line, audible signals corresponding in number to the number of classes of telephone lines, automatic means for connecting the signal indicative of the class to which the calling telephone line belongs to said circuit, and relay controlled means for decreasing the supply of talking current to the calling line while said signal is connected with said trunk circuit.

18. In a telephone system, a telephone line, an operator's trunk circuit, an automatic switch controlled from said line for extending a connection to said trunk circuit, a holding conductor extending back to said switch from said circuit, a relay in said circuit operative upon the extension of said connection to connect direct ground to said holding conductor, an audible signal and means for connecting it to said holding conductor, an induction coil, a second relay in said trunk circuit controlled by the operator to connect one winding of said induction coil in series with said ground connection and said holding conductor, and for connecting the other winding of said induction coil across the talking conductors of said trunk circuit to enable said operator to hear said audible signal.

19. In a telephone system, a telephone line, an operator's trunk circuit, an automatic switch controlled from said line for extending a connection to said circuit, a holding conductor extending back to said switch from said circuit, a source of signalling current and means for connecting it to said holding conductor, an induction coil, a relay in said circuit operative upon the extension of said connection to connect ground through a winding of said induction coil to said holding conductor, a second ground connection normally short circuiting the winding of said induction coil, a second relay in said trunk circuit controlled by the operator, and contacts on said relay for opening said short circuit and for connecting the other winding of said induction coil across the talking conductors of said trunk circuit to enable the operator to hear said signal.

20. In a telephone system, a telephone line, an operator's trunk circuit, an automatic switch controlled from said line for extending a connection to said trunk circuit, a holding conductor extending back to said switch from said trunk circuit, a signal, means for connecting said signal to said holding conductor, an induction coil having two windings, a line relay in said trunk circuit energized upon the extension of said connection, a second relay, a circuit for said second relay controlled by said first relay, means controlled by said second relay for connecting ground through one winding of said induction coil to said holding conductor, a second ground connection normally short circuiting the winding of said induction coil, a third relay controlling said second ground connection, operator control means for energizing said third relay to remove said short circuit and to place the other winding of said induction coil across the talking conductors of said trunk circuit to render said signal audible to the operator, means controlled by said third relay for opening the circuit of said line relay, and a holding circuit for said second relay closed by said third relay.

21. In a telephone system, a first trunk section comprising two talking conductors and a release trunk conductor, a second trunk section comprising two talking conductors, an induction coil, a relay energized over said second section, and contacts on said relay actuated when the same is energized for inductively connecting the release trunk conductor of the first section with the talking conductors of the second section through the medium of said induction coil.

22. In a telephone system, the combination with an operator's switchboard, of a trunk line extending to said switchboard, a release trunk conductor in said trunk line extending only part way to said switchboard, and means at the point where said release trunk conductor terminates controlled from said switchboard over a single one of the talking conductors of the trunk line for inductively connecting said release conductor with said talking conductors.

23. In a telephone system, a trunk line comprising two inductively connected sections, a release trunk conductor associated with the first section and terminating at the junction of said sections, means including a relay for inductively connecting said release conductor with the talking conductors of said second section, and a circuit for said relay including only one talking conductor of the said second section.

24. In a telephone system, a trunk line comprising two inductively connected sections, a release trunk conductor associated with the first section, an induction coil, a bridge across the second section of the trunk line including one winding of said coil, a holding circuit including said release trunk conductor and the other winding of said coil, and means controlled over the said second section for closing said bridge and circuit.

25. In a telephone system, a trunk line comprising two inductively connected sections, a release trunk conductor associated with the first section, an induction coil, a bridge across the second section of the trunk line including one winding of said coil, a holding circuit including said release trunk conductor and the other winding of said coil, and a relay energized over a conductor of said second section for closing said bridge and circuit.

26. In a telephone system, an operator's switchboard, a calling line, means including two serially related trunk lines for extending said line to said switchboard, the second of said trunk lines comprising two inductively connected sections, a source of signalling current, a relay for associating said source with said first trunk line to place tone current thereon, a second relay for controlling said first relay over a talking conductor of said first trunk line and a talking conductor of the first section of the second trunk line, and means at said switchboard for controlling said second relay over a talking conductor of the second section of said second trunk line.

Signed by me at Chicago, Illinois, this 28th day of April, 1924.

TALBOT G. MARTIN.